(12) United States Patent
Bleeck et al.

(10) Patent No.: US 9,383,028 B2
(45) Date of Patent: Jul. 5, 2016

(54) VALVE

(71) Applicant: Continental Automotive GmbH, Hannover (DE)

(72) Inventors: Matthias Bleeck, Regensburg (DE); Bernd Gugel, Regensburg (DE); Thomas Krueger, Themar (DE); Bernd Woellisch, Cham (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 68 days.

(21) Appl. No.: 14/369,288

(22) PCT Filed: Dec. 21, 2012

(86) PCT No.: PCT/EP2012/076695
§ 371 (c)(1),
(2) Date: Jun. 27, 2014

(87) PCT Pub. No.: WO2013/098249
PCT Pub. Date: Jul. 4, 2013

(65) Prior Publication Data
US 2015/0083948 A1    Mar. 26, 2015

(30) Foreign Application Priority Data

Dec. 28, 2011 (DE) .......................... 10 2011 090 006

(51) Int. Cl.
*F02M 59/36* (2006.01)
*F02M 63/02* (2006.01)
(Continued)

(52) U.S. Cl.
CPC .............. *F16K 31/06* (2013.01); *F02M 59/367* (2013.01); *F02M 63/0015* (2013.01); *F02M 63/0022* (2013.01); *F02M 63/0031* (2013.01)

(58) Field of Classification Search
CPC ............ F02M 59/367; F02M 63/0022; F02M 63/0015; F02M 63/0031; F02M 59/366; F02M 59/365; F16K 31/06; F16K 31/0655
USPC ............... 251/129.15, 129.19, 129.2, 82, 284
See application file for complete search history.

(56) References Cited

U.S. PATENT DOCUMENTS

| | | | |
|---|---|---|---|
| 3,733,047 A * | 5/1973 | Allen ..................... | F16K 11/044 137/625.5 |
| 4,905,960 A * | 3/1990 | Barnhart ............ | F02M 63/0015 251/129.18 |

(Continued)

FOREIGN PATENT DOCUMENTS

| | | | | |
|---|---|---|---|---|
| DE | 102007028960 A1 * | 12/2008 | ........... | F02M 59/102 |
| DE | 102007034038 A1 | 1/2009 | ............. | F02M 59/36 |

(Continued)

OTHER PUBLICATIONS

International Search Report and Written Opinion, Application No. PCT/EP2012/076695, 14 pages, Apr. 2, 2013.

*Primary Examiner* — Mary McManmon
*Assistant Examiner* — David Colon Morales
(74) *Attorney, Agent, or Firm* — Slayden Grubert Beard PLLC

(57) ABSTRACT

A valve includes a spring with a spring force, an actuator with an actuator force which can act against the spring force, a pin which can be actuated by the actuator, a sealing element which can be coupled with the pin, and a seal seat such that the valve is closed when the sealing element rests against the seal seat. The pin can be moved in the direction of the sealing element by means of the actuator, and the pin can be moved in the direction away from the sealing element by means of the spring. The sealing element can be moved into an open position independently of the pin, wherein a fluid flow through the valve is released in the open position.

18 Claims, 1 Drawing Sheet

(51) Int. Cl.
*F16K 31/06* (2006.01)
*F02M 63/00* (2006.01)

(56) References Cited

U.S. PATENT DOCUMENTS

| | | | | |
|---|---|---|---|---|
| 5,170,987 A * | 12/1992 | Krauss | ............... | F02M 61/12 |
| | | | | 239/585.4 |
| 5,186,151 A * | 2/1993 | Schwerdt | ............... | F02M 57/02 |
| | | | | 123/467 |
| 5,494,255 A * | 2/1996 | Pearson | ............ | F02M 25/0714 |
| | | | | 123/568.26 |
| 5,548,263 A * | 8/1996 | Bulgatz | ................ | F01L 9/04 |
| | | | | 123/90.11 |
| 5,992,821 A * | 11/1999 | Rookes | ............... | F02M 59/466 |
| | | | | 251/129.1 |
| 6,345,608 B1 * | 2/2002 | Rembold | ............. | F02M 59/34 |
| | | | | 123/456 |
| 6,566,990 B2 * | 5/2003 | Oyama | ................. | F01L 1/462 |
| | | | | 251/129.15 |
| 6,631,706 B1 * | 10/2003 | Yamada | ............... | F02M 59/442 |
| | | | | 123/447 |
| 6,874,706 B2 * | 4/2005 | Hanneke | ............. | F02M 47/027 |
| | | | | 239/533.2 |
| 6,997,433 B2 * | 2/2006 | Koneda | ................ | F01L 9/04 |
| | | | | 123/90.11 |
| 7,163,188 B1 * | 1/2007 | Sisk | .................. | F16K 31/0689 |
| | | | | 251/129.19 |
| 7,600,738 B2 * | 10/2009 | Hatano | .............. | F02M 25/0773 |
| | | | | 123/90.11 |
| 7,819,637 B2 * | 10/2010 | Oda | ................... | F02M 59/366 |
| | | | | 251/129.07 |
| 7,828,265 B2 * | 11/2010 | Sisk | ................... | F16K 31/0655 |
| | | | | 251/129.19 |
| 2004/0155212 A1 * | 8/2004 | Hess | ...................... | F01P 7/14 |
| | | | | 251/64 |
| 2004/0223856 A1 * | 11/2004 | Rembold | ............ | F02M 59/366 |
| | | | | 417/222.2 |
| 2008/0073605 A1 * | 3/2008 | Ishigaki | .............. | F16K 1/36 |
| | | | | 251/12 |
| 2008/0156905 A1 * | 7/2008 | Shafer | ............... | F02M 63/0015 |
| | | | | 239/585.1 |
| 2008/0203347 A1 * | 8/2008 | Burrola | ................ | F02M 55/04 |
| | | | | 251/284 |
| 2010/0007224 A1 * | 1/2010 | Manubolu | ........... | F02M 47/027 |
| | | | | 310/14 |
| 2010/0111734 A1 * | 5/2010 | Usui | .................... | F02M 59/366 |
| | | | | 417/505 |
| 2010/0206252 A1 | 8/2010 | Schroeder et al. | ........... | 123/90.5 |
| 2010/0327202 A1 * | 12/2010 | Birkelund | .............. | F16K 31/06 |
| | | | | 251/129.15 |
| 2011/0265765 A1 * | 11/2011 | Furuhashi | ........... | F02D 41/3809 |
| | | | | 123/446 |

FOREIGN PATENT DOCUMENTS

| | | | | |
|---|---|---|---|---|
| JP | 09112731 A | 5/1997 | ............ | F02M 47/00 |
| JP | 2007138981 A | 6/2007 | ............ | F02M 51/00 |
| JP | 2009133208 A | 6/2009 | ............ | F02M 51/06 |
| WO | 2013/098249 A1 | 7/2013 | ............ | F02M 59/36 |

* cited by examiner

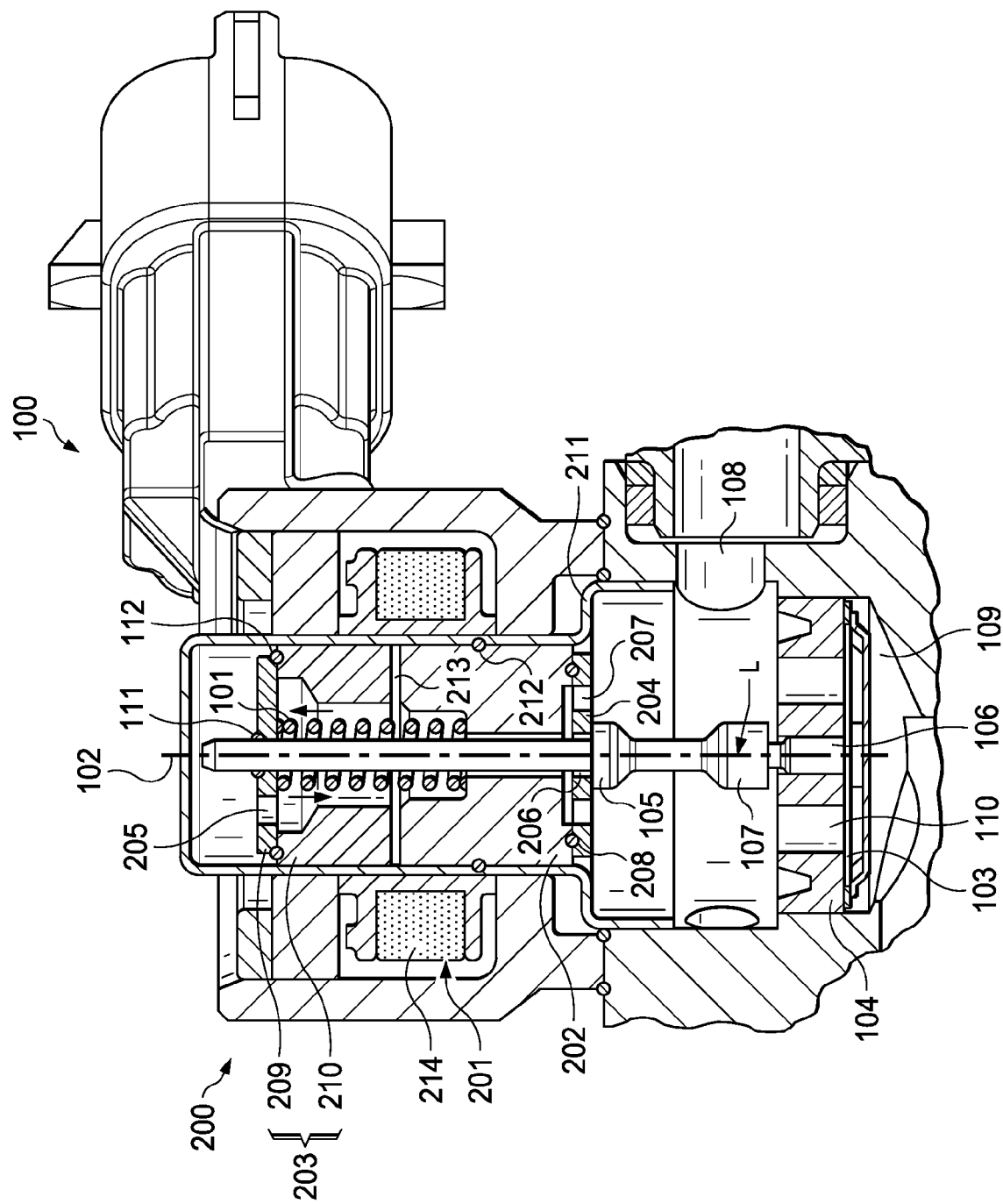

VALVE

CROSS-REFERENCE TO RELATED APPLICATIONS

This application is a U.S. National Stage Application of International Application No. PCT/EP2012/076695 filed Dec. 21, 2012, which designates the United States of America, and claims priority to DE Application No. 10 2011 090 006.3 filed Dec. 28, 2011, the contents of which are hereby incorporated by reference in their entirety.

TECHNICAL FIELD

The invention relates to a valve. In particular, a valve of this type is used in a high pressure pump for delivering fluid for a common rail injection system for internal combustion engines of motor vehicles.

BACKGROUND

Valves of this type are subjected to great loads, in particular if they are exposed to continuous loads, such as in high pressure pumps. Since high pressure pumps are exposed to pressures of, for example, 2000 bar or more, high requirements are made of the valves in pumps of this type.

The same applies to the actuator arrangements in valves of this type. They have to be capable of reliably opening and/or closing the valve, in particular, over a long time period of the service life of the motor vehicle, and they have to operate within predefined tolerance ranges.

DE 10 2007 028 960 A1 describes a valve in a high pressure pump. The valve has a valve needle with a hydraulic driver which, in the case of fuel flowing in onto the valve needle, exerts a force which acts in the opening direction on the valve needle. A valve body for closing the valve can be moved independently of the valve needle into an open position, in which a fluid flow through the valve is released.

JP 9 112 731 A discloses a valve for a fuel pump. The valve has an actuator for moving a pin.

The pin is not connected fixedly to a valve element for closing the valve.

SUMMARY

One embodiment provides a valve, comprising: a spring with a spring force, an actuator with an actuator force which can act counter to the spring force, a pin which can be actuated by means of the actuator, a sealing element which can be coupled to the pin, a sealing seat, with the result that the valve is closed when the sealing element bears against the sealing seat, wherein the pin can be moved in the direction of the sealing element by means of the actuator, the pin can be moved in the direction away from the sealing element by means of the spring, wherein the sealing element can be moved independently of the pin into an open position, in which a fluid flow through the valve is released, wherein the actuator comprises an electromagnet, comprising a coil which surrounds a pole core, a magnet armature which can be moved by means of the electromagnet, wherein the pin is coupled to the magnet armature and is arranged in such a way that it runs along a longitudinal axis of the electromagnet through the pole core, with the result that the magnet armature is arranged on one side of the pole core and a separate stop element is arranged on the opposite side of the pole core, which separate stop element limits a movement of the pin in the direction of the pole core, and the stop element is formed from a harder material than the pole core.

In a further embodiment, the pin has a projecting region which faces the sealing seat, and the movement of the pin in the direction of the sealing element is limited by the projecting region and the sealing seat.

In a further embodiment, the pin has a further projecting region which limits a movement of the pin in the direction of the actuator.

In a further embodiment, the sealing element is arranged spaced apart from the pin when the valve is closed.

In a further embodiment, the sealing element can be moved into the open position by the actuator force.

In a further embodiment, the magnet armature and the pin are coupled such that they are immovable relative to one another.

In a further embodiment, the magnet armature has at least one magnet armature recess for hydraulic communication between a side of the magnet armature, which side faces the pole core, and a side of the magnet armature, which side faces away from the pole core.

In a further embodiment, the stop element has a recess, through which the pin is guided, and has at least one further recess for hydraulic communication between a side of the stop element, which side faces away from the pole core, and a side of the stop element, which side faces the pole core.

In a further embodiment, the valve comprises a welded connection which couples the stop element to the pole core.

In a further embodiment, the spring is coupled with one end to the pole core and with an opposite end to the magnet armature.

BRIEF DESCRIPTION OF THE DRAWINGS

Aspects of the invention are discussed below with reference to FIG. 1, which is a diagrammatic illustration of a valve with an actuator arrangement in a sectional view according to one embodiment.

DETAILED DESCRIPTION

Embodiments of the invention provide a reliable valve, e.g., for delivering fluid in a common rail injection system of an internal combustion engines of a motor vehicle.

In one embodiment, a valve comprises a spring with a spring force. The valve comprises an actuator with an actuator force which can act counter to the spring force. Furthermore, the valve comprises a pin which can be actuated by means of the actuator.

The valve comprises a sealing element which can be coupled to the pin. Furthermore, the valve comprises a sealing seat, with the result that the valve is closed when the sealing element bears against the sealing seat. The pin can be moved in the direction of the sealing element by means of the actuator. The pin can be moved in the direction away from the sealing element by means of the spring. The sealing element can be moved independently of the pin into an open position, in which a fluid flow through the valve is released.

Furthermore, the actuator comprises an electromagnet. The electromagnet comprises a coil which surrounds a pole core. Furthermore, the actuator comprises a magnet armature. The magnet armature can be moved by means of the electromagnet. The pin is coupled to the magnet armature and is arranged in such a way that it runs along a longitudinal axis of the electromagnet through the pole core. The magnet armature is arranged on one side of the pole core and a separate stop element is arranged on the opposite side of the pole core, which separate stop element limits a movement of the pin in the direction of the pole core.

In particular, the stop element is formed from a harder material than the pole core. The stop element serves as a stop for the movement of the pin and protects the pole core at the same time. As a result, reliable operation is possible even over a long service life period, since the stop element always represents a fixed limit for the movement of the pin. Tolerance fluctuations on account of wear as a result of the contact of the pin are kept low.

The stop element and the pole core are produced, in particular, from two independent components. According to embodiments, the stop element and the pole core are formed from different materials. The pole core is formed, in particular, from a ferromagnetic material. The stop element is produced, in particular, from a material which is as hard as possible. Low wear is therefore possible.

The valve is opened when the actuator transmits its actuator force to the pin and the pin is moved relative to the sealing seat. The pin passes into contact with the sealing element and presses the latter away from the sealing seat, with the result that the sealing seat and the sealing element are spaced apart from one another, with the result that a fluid flow through the sealing element is released. The valve is in its open position.

By virtue of the fact that the pin and the sealing element are not connected fixedly to one another, it is possible that the sealing element lifts up from the sealing seat and a fluid flow is released even when the pin remains in its rest position and the actuator does not cause an actuator force. For example, the sealing element lifts up from the sealing seat during a suction stroke of the pump. To this end, the valve and, in particular, the actuator do not have to be actuated electrically. The pin is held by the spring in its rest position, in which it is not in contact with the sealing element.

In one embodiment, the pin of the valve has a projecting region which faces the sealing seat. The movement of the pin in the direction of the sealing element is limited by the projecting region and the sealing seat.

According to some embodiments, the pin has a further projecting region which limits a movement of the pin in the direction of the actuator. The movement of the pin in the direction of the actuator is therefore limited even when the pin does not have a fixed connection to the sealing element.

According to some embodiments, the magnet armature and the pin are coupled such that they are immovable relative to one another. The pin can therefore be moved by the electromagnet by means of the magnet armature. The magnet armature can be moved by way of a movement of the pin.

According to some embodiments, the magnet armature has at least one magnet armature recess for hydraulic communication between a side of the magnet armature, which side faces the pole core, and a side of the magnet armature, which side faces away from the pole core.

According to further embodiments, the stop element comprises a recess, through which the pin is guided. The stop element comprises at least one further recess for hydraulic communication between a side of the stop element, which side faces away from the pole core, and a side of the stop element, which side faces the pole core.

Pressure equalization in the interior of the actuator is possible by way of the magnet armature recess and/or the at least one further recess of the stop element.

In some embodiments, the actuator is used in a valve, in which a sealing element is connected fixedly to the pin. The sealing element follows a movement of the pin in a first direction and in the opposite direction.

According to further embodiments, the actuator is used in a valve, in which the pin and the sealing element are separate individual parts which can be coupled. The sealing element follows a movement of the pin in a first direction. The sealing element does not necessarily follow a movement of the pin in the opposite direction.

Further advantages, features and developments result from the following examples which are explained in conjunction with FIG. 1.

FIG. 1 shows a diagrammatic illustration of a valve with an actuator arrangement in a sectional view according to one embodiment.

FIG. 1 shows a valve 100. The valve 100 is, in particular, an inlet valve of a pump. The pump is configured, in particular, as a high pressure pump, preferably as a radial piston pump. A pump piston is mounted movably in the pump. A pressure space is situated at one end of the pump piston. In order for it to be possible to fill the pressure space with fluid, said pressure space has an inflow line, in which the valve 100 which is configured as an inlet valve is preferably arranged. The valve 100 is preferably configured as a digitally switched valve. The valve 100 facilitates the filling of the pressure space and is set up, during the ejection of the fluid, to prevent a return flow of the fluid into the inflow line when the valve 100 is closed. Fluid can be ejected from the pressure space, for example, via an outflow line.

The valve 100 has a spring 101, a pin 102 and a sealing element 103. The spring 101 prestresses the pin 102 in the direction away from the sealing element 103, by the spring 101 being supported on a pole core 202 of an actuator 200 of the valve 100. The spring 101 is supported with its second end on an armature element 209. Together with a further armature element 210, the armature element 209 is part of a magnet armature 203.

The pin 102 is extended in an elongate manner and runs along a longitudinal axis L through the pole core 202. On one side of the pole core 202, the pin 102 is coupled to the armature element 209. In particular, the armature element 209 is coupled to the pin 102 by means of a welded connection 111. On that side of the pole core 202 which lies opposite along the longitudinal axis, the pin 102 has a projecting region 105. The pin 102 has a further projecting region 107 which faces a sealing seat 104 of the valve 100.

The actuator 200 comprises an electromagnet 201. The electromagnet 201 comprises a coil 214 which is arranged, in particular, annularly around the pole core 202. The coil 214 surrounds the longitudinal axis L coaxially. The magnet armature 203, following this the pole core 202 and following this the sealing seat 104 are arranged along the longitudinal axis L. The sealing element 103 is arranged on a side of the sealing seat 104, which side faces away from the actuator 200. The sealing seat 104 surrounds at least one passage recess 110. Fluid can flow via the passage recess 110 when the sealing element 103 does not bear against the sealing seat 104. In particular, fluid from a fluid inflow 108 can flow through the passage recesses 110 into a fluid outflow 109.

If current or voltage is applied to the electromagnet 201, in particular to the coil 214, said electromagnet 201 exerts a magnetic force on the magnet armature 203 in the direction of the sealing element 103. This actuator force Fa is transmitted to the pin 102, since both the armature element 209 and the further armature element 210 are coupled via a welded connection 112 and the magnet armature 203 is coupled to the pin 102 via the welded connection 111, such that they are immovable relative to one another. The pin 102 is therefore moved in the direction of the sealing element 103 by the actuator force Fa. The pin 102 couples with the sealing element 103 and presses the latter in the further movement sequence away from the sealing seat 104. The valve is therefore open.

The valve 100 also opens without the pin 102 being moved or without the pin 102 and the sealing element 103 coming into contact with one another, but merely on account of a pressure difference upstream and downstream of the sealing element 103. The sealing element 103 lifts up from the sealing seat 104 when the pressure on the side of the inflow 108 is greater than on the side of the outflow 109.

The valve can therefore be opened in two ways. The valve can be opened necessarily by the actuator or can be held open counter to a pressure from the outflow 109. However, the valve 110 can also open in a passive manner, without it having to be actuated electrically, when the pump is in the intake phase and carries out its suction stroke and sucks fluid into the pressure space.

In a rest position when the actuator 200 is not energized, the spring 101 presses the pin 102 in a direction away from the sealing element 103. A spring force Ff of the spring 101 holds the pin 102 in such a way that the sealing element 103 can bear against the sealing seat 104. The spring force Ff and the actuator force Fa are directed in opposite directions. The spring force Ff and the actuator force Fa are directed in the same direction as the longitudinal axis L. In order to close the valve, the sealing element is pressed against the sealing seat 104 by the pressure conditions upstream and downstream of the sealing element and therefore prevents a fluid flow from the outflow 109 into the inflow 108.

The movement of the sealing element 103 relative to the sealing seat 104 is therefore independent of a movement of the pin 102 in one operating state of the valve. By way of the pin 102, the opening of the valve 100 can be assisted and/or the valve 100 can be held in its open position even during a delivery stroke in a compression phase of the pump. Partial conveying of the pump can therefore be achieved, in which a predefined proportion of the fluid which is sucked in is conveyed out of the pressure space back into the inflow 108 again. To this end, the sealing element 103 is held spaced apart from the sealing seat 104 by way of the pin 102. The actuator 200 exerts the actuator force Fa on the pin 102 in such a way that the pin 102 can hold the sealing element 103 against the fluid pressure from the pressure space and fluid can therefore flow through the passage recesses 110 back into the inflow 108.

Full delivery of the pump can be realized independently of the actuator 200. In the intake phase of the pump, the actuator 200 does not have to operate counter to a spring force which presses the sealing element against the sealing seat. In the compression phase, the sealing element 103 assists the spring 101 during the closing operation, since the sealing element 103 moves the pin 102. Short closing times of the valve 101 can be realized in this way. An air gap 213 between the further armature element 210 and the pole core 202 is constant in the rest state.

The magnet armature 203 with the coupled pin 102 is pulled in the direction of the pole core 202 when the electromagnet 201 is energized. The pin 102 opens the sealing element 103. When the electromagnet 201 is not energized, the magnet armature 203 with the pin 102 is pressed by the spring 101 into the starting position. The inlet valve is unblocked as a result.

A movement of the pin 102 in the direction away from the sealing element 103 is limited by a stop element 204. In particular, the projecting region 105 of the pin 102 comes into contact with the flatly extended stop element 204. The pin 102 is decoupled from the resilient sealing element 103. The sealing element 103 is designed in such a way that, when the electromagnet 201 is switched off, there is no pressure against the sealing element 103 by way of the pin 102. The valve 100 can operate independently of the electromagnet 201 and the pin 102 and, in particular, can open independently of the electromagnet 201 in the intake phase. In the compression phase, the spring force of the sealing element acts in addition to the spring 101, in order to close the inlet valve.

The stop element 204 serves as a limit of the movement of the pin 102. When the projecting region 105 comes into contact with the stop element 204, a movement of the pin 102 further away from the sealing element 103 is no longer possible. As a result, a spacing 106 between the pin 102 and the sealing element 103 in the rest position is also predefined. The movement of the pin in the direction of the sealing element 103 is limited by the further projecting region 107 and the sealing seat 104.

The stop element 204 has a recess 206, through which the pin 102 is guided. The stop element 204 is arranged on that side of the pole core 202 which faces away from the magnet armature 203. In particular, the stop element 204 is coupled to the pole core 202 via a welded connection 208. The stop element 204 is, in particular, a hardened disk which protects the softer pole core 202.

According to embodiments, the stop element 204 has at least one further recess 207. The latter is coupled hydraulically to the recess of the pole core 202, in which the pin 102 is guided through the pole core 202. Furthermore, the armature element 209 has a magnet armature recess 204 which is coupled hydraulically to the recess of the pole core 202. Therefore, that side of the magnet armature 203 which faces away from the sealing element 103 and that side of the stop element 204 which faces the sealing element 103 are coupled to one another hydraulically. Pressure equalization can therefore take place between the fluid-conducting region at the fluid inflow 108 and the region of the magnet armature 203. A movement of the pin 102 on account of pressure imbalances is therefore avoided.

The pole core 202 is coupled via a welded connection 212 to a housing 211, in which the magnet armature 203 and partially the pin 102 are arranged. The housing 211 surrounds the pin 102, the magnet armature 203 and the pole core 202 in a fluid-tight manner.

By way of the stop element 204, a movement of the pin 102 in the direction of the spring force Ff is limited and forces during braking of the movement of the pin 102 are absorbed by the stop element 204. In addition, precise setting of the air gap 213 is possible by way of the limiting of the movement of the pin 102. There is therefore a limit for the movement of the pin 102 by way of the stop element 204, although the pin 102 is not coupled fixedly to the sealing element 103.

What is claimed is:
1. A valve, comprising:
   a spring having a first end and a second end, the spring providing a spring force,
   an actuator providing an actuator force that acts counter to the spring force,
   a pin configured for actuation by the actuator,
   a sealing element and a sealing seat, wherein the valve is closed when the sealing element bears against the sealing seat,
   wherein the pin is moveable toward the sealing element by the actuator, and moveable away from the sealing element by the spring,
   wherein the sealing element is moveable independent from the pin into an open position in which a fluid flow through the valve is allowed, wherein the actuator comprises:
an electromagnet comprising a coil that surrounds a pole core, and
a magnet armature moveable by the electromagnet,
wherein the first end of the spring is directly coupled to the pole core and the second end of the spring is directly coupled to the magnet armature and the spring force works to distance the pole core and the magnet armature,
wherein the pin is coupled to the magnet armature and runs along a longitudinal axis of the electromagnet through the pole core,
wherein the magnet armature is arranged on a first side of the pole core and a separate stop element is arranged on an opposite second side of the pole core, the separate stop element configured to limit a movement of the pin toward the pole core, and
wherein the stop element is formed from a harder material than the pole core.

2. The valve of claim 1, wherein:
the pin has a projecting region that faces the sealing seat, and
the movement of the pin toward the sealing element is limited by the projecting region and the sealing seat.

3. The valve of claim 1, wherein the pin has a further projecting region that limits a movement of the pin toward the actuator.

4. The valve of claim 1, wherein the sealing element is spaced apart from the pin when the valve is closed.

5. The valve of claim 1, wherein the sealing element is moveable into the open position by the actuator force.

6. The valve of claim 1, wherein the magnet armature and the pin are coupled such that they are immovable relative to one another.

7. The valve of claim 1, wherein the magnet armature has at least one magnet armature recess for hydraulic communication between a first side of the magnet armature facing the pole core and a second side of the magnet armature facing away from the pole core.

8. The valve of claim 1, wherein the stop element has a first recess, through which the pin is guided, and at least one further recess for hydraulic communication between a first side of the stop element that faces away from the pole core and a second side of the stop element that faces the pole core.

9. The valve of claim 1, comprising a welded connection of the stop element to the pole core.

10. A high pressure pump, comprising:
a pump piston,
an flow line providing inflow to the pump piston, and
an inlet valve disposed in the flow line, the inlet valve comprising:
a spring providing a spring force,
an actuator providing an actuator force that acts counter to the spring force,
a pin configured for actuation by the actuator,
a sealing element and a sealing seat, wherein the valve is closed when the sealing element bears against the sealing seat,
wherein the pin is moveable toward the sealing element by the actuator, and moveable away from the sealing element by the spring,
wherein the sealing element is moveable independent from the pin into an open position in which a fluid flow through the valve is allowed,
wherein the actuator comprises:
an electromagnet comprising a coil that surrounds a pole core, and
a magnet armature moveable by the electromagnet,
wherein the first end of the spring is directly coupled to the pole core and the second end of the spring is directly coupled to the magnet armature and the spring force works to distance the pole core and the magnet armature,
wherein the pin is coupled to the magnet armature and runs along a longitudinal axis of the electromagnet through the pole core,
wherein the magnet armature is arranged on a first side of the pole core and a separate stop element is arranged on an opposite second side of the pole core, the separate stop element configured to limit a movement of the pin toward the pole core, and
wherein the stop element is formed from a harder material than the pole core.

11. A high pressure pump according to claim 10, wherein:
the pin has a projecting region that faces the sealing seat, and
the movement of the pin toward the sealing element is limited by the projecting region and the sealing seat.

12. A high pressure pump according to claim 10, wherein the pin has a further projecting region that limits a movement of the pin toward the actuator.

13. A high pressure pump according to claim 10, wherein the sealing element is spaced apart from the pin when the valve is closed.

14. A high pressure pump according to claim 10, wherein the sealing element is moveable into the open position by the actuator force.

15. A high pressure pump according to claim 10, wherein the magnet armature and the pin are coupled such that they are immovable relative to one another.

16. A high pressure pump according to claim 10, wherein the magnet armature has at least one magnet armature recess for hydraulic communication between a first side of the magnet armature facing the pole core and a second side of the magnet armature facing away from the pole core.

17. A high pressure pump according to claim 10, wherein the stop element has a first recess, through which the pin is guided, and at least one further recess for hydraulic communication between a first side of the stop element that faces away from the pole core and a second side of the stop element that faces the pole core.

18. A high pressure pump according to claim 10, comprising a welded connection of the stop element to the pole core.

* * * * *